Patented Jan. 21, 1936

2,028,246

UNITED STATES PATENT OFFICE 2,028,246

METHOD OF PREPARING BENZOYL PERSULPHIDE

Theodore H. Rider and Robert Shelton, Mariemont, Ohio, assignors to The Wm. S. Merrell Company, Cincinnati, Ohio, a corporation of Ohio No Drawing. Application August 2, 1934, Serial No. 738,110

8 Claims. (Cl. 260—16)

The present invention relates to a method of preparing benzoyl persulphide and has for its principal object the provision of a method whereby large scale economic preparation of this product may be carried on with a resultant purity of product satisfactory for medicinal use.

Another object of the invention is to provide a method of the character described that produces a yield considerably in excess of that reported from other methods.

These and other objects are attained by the method hereinafter described.

Benzoyl persulphide has recently been recognized as a compound suitable for the treatment of a variety of skin conditions, especially those attended by the sensation of itching. Chemical literature on the subject shows that there are several alternate methods which have been used in the preparation of small quantities of the compound. None of said methods, however, are directly applicable to economic production of the compound on a large scale nor is the product so attained of a purity satisfactory for medicinal use. The maximum yield by any of these methods is reported to be fifty per cent of theoretical.

The present invention provides a method of preparation which gives a compound of high purity under economic conditions. It is based upon the reaction of benzoyl chloride and sodium hydro-sulphide, which has not been described as such. Literature records a somewhat similar reaction of benzoyl chloride and hydrogen sulphide in a medium made alkaline with potash but this method as described does not produce results at all comparable with those achieved with the method of this invention.

The general method of the invention is to react benzoyl chloride with an aqueous solution of sodium hydrosulphide and to oxidize the resulting reaction mixture by suitable means to give a precipitate of benzoyl persulphide which is then isolated and purified.

The following specific example is to be considered as illustrative of the general method of preparation and of purification and the invention is not to be understood as limited thereto.

Benzoyl chloride, 140 grams, is slowly added to 67 grams or slightly more of anhydrous sodium hydrosulphide (in aqueous solution). The mixture is kept cool below 10° C. during this addition and oxygen (or air) is simultaneously or subsequently run through the vigorously stirred solution. The mixture is allowed to stand for a short time at a temperature not above 30° C. and is then filtered. The precipitate is crude benzoyl persulphide. A further quantity of this material can be recovered from the filtrate by acidifying with a mineral acid and further oxidizing with a suitable medium such as air, oxygen, hydrogen peroxide, or other suitable mild oxidizing agent. This further material which precipitates is filtered off and added to the original precipitate, giving a total yield of crude benzoyl persulphide approximately 85%–90% of the theoretical. The material as recovered is relatively pure as attested by its melting point of approximately 122–125° C.

This material is further purified for medicinal use by dissolving in a warm organic solvent which is miscible with alcohol but which is not miscible with water. Chloroform is preferred as this solvent. Carbon tetrachloride, the chloro ethylenes or carbon disulphide are usable as the organic solvent. The solution is then stirred vigorously with a dilute aqueous solution of alkali which dissolves from the organic solvent the by-product benzoic acid and colored impurities. The organic solvent solution of benzoyl persulphide is then separated from the aqueous solution and the purified benzoyl persulphide is precipitated by adding the necessary quantity of an aliphatic alcohol, the boiling point of which should preferably be below 100° C. and which must be capable of being evaporated from the precipitate either at atmospheric or reduced pressure without heating above 60° C. Ethyl or methyl alcohol is preferred for this purpose. The yield of purified benzoyl persulphide is approximately 80% of the theoretical (90% of the crude) and the melting point is 128–129° C. denoting a high state of purity.

What is claimed is:

1. The method of preparing medicinally pure benzoyl persulphide which consists in the steps of reacting benzoyl chloride with an aqueous solution of sodium hydrogen sulphide, oxidizing the resultant reaction mixture with a mild oxidizing agent whereupon a relatively pure benzoyl persulphide is yielded and which relatively pure benzoyl persulphide is then further purified by the steps of dissolving it in a suitable organic solvent which is effective to dissolve benzoyl persulphide and is also miscible with alcohol but not with water, washing this solution with dilute aqueous alkali to remove benzoic acid and other impurities including those which give color to the crude material, and then separating the organic solution of benzoyl persulphide and throwing this product out of solution by the addition of an aliphatic alcohol vaporizing below the decomposition point of the benzoyl persulphide.

2. The method of preparing medicinally pure benzoyl persulphide which comprises the steps of reacting benzoyl chloride with an aqueous solution of sodium hydrogen sulphide, oxidizing the resulting reaction mixture simultaneously with a mild oxidizing agent, this combination of steps yielding a relatively pure benzoyl persulphide, then further purifying the said benzoyl persulphide by dissolving it in a suitable organic solvent which is effective to dissolve benzoyl persulphide and is also miscible with alcohol but not with water, then washing this solution with dilute aqueous alkali to remove benzoic acid and other impurities including those impurities which give color to the crude material, separating the organic solution of benzoyl persulphide and finally throwing this compound out of solution by the addition of an aliphatic alcohol which vaporizes below the decomposition point of benzoyl persulphide.

3. The method of preparing benzoyl persulphide which comprises the steps of reacting benzoyl chloride with an aqueous solution of sodium hydrogen sulphide and oxidizing the reaction mixture with a mild oxidizing agent.

4. The steps in the preparation of benzoyl persulphide which consist in the reaction of benzoyl chloride with an aqueous solution of sodium hydrogen sulphide and the simultaneous oxidation of the mixture with a mild oxidizing agent.

5. The steps in the preparation of benzoyl persulphide which consist in the reaction of benzoyl chloride with an aqueous solution of sodium hydrogen sulphide and the simultaneous oxidation of the mixture by a stream of gas containing oxygen.

6. The steps in the preparation of benzoyl persulphide which consist in reacting benzoyl chloride with an aqueous solution of sodium hydrogen sulphide, acidifying and oxidizing the reaction mixture with hydrogen peroxide.

7. The method of purifying crude benzoyl persulphide which consists in dissolving this material in an organic solvent which is effective to dissolve benzoyl persulphide and is also miscible with alcohol but not with water, extracting impurities by washing with dilute aqueous alkali, separating the organic solution of benzoyl persulphide and then throwing the compound out of solution as a pure crystalline product by the addition of an aliphatic alcohol which can be evaporated from the precipitate without heating it to a point of instability.

8. The method of preparing medicinally pure benzoyl persulphide which comprises the steps of slowly mixing with vigorous agitation benzoyl chloride and sodium hydrosulphide solution while the same is kept cool below 10° C. and simultaneously running oxygen therethrough during the mixing, then allowing the same to stand at a temperature not over 30° C. until precipitation is complete, then filtering the precipitated crude benzoyl persulphide, then acidifying the filtrate with mineral acid and oxidizing the same with a mild oxidizing agent to produce a further precipitate, filtering out said further precipitate and adding it to the first precipitate, then dissolving the total precipitate in a warm organic solvent which is effective to dissolve benzoyl persulphide and is also miscible with alcohol but not with water, then vigorously stirring this solution with a dilute aqueous solution of alkali to dissolve from the organic solvent the by-product benzoic acid and other impurities, then separating the organic solvent solution of benzoyl persulphide from the aqueous solution and precipitating the purified benzoyl persulphide by adding an aliphatic alcohol which can be evaporated below the decomposition point of purified benzoyl persulphide.

THEODORE H. RIDER.
ROBERT SHELTON.